Patented Sept. 14, 1954

2,689,236

UNITED STATES PATENT OFFICE 2,689,236

COLOR STABILIZER COMBINATION

Myron Q. Webb, Waynesboro, Va., assignor to E. I. du Pont de Nemours and Company, Wilmington, Del., a corporation of Delaware No Drawing. Application January 11, 1951, Serial No. 205,604

13 Claims. (Cl. 260—32.6)

This invention relates to the preparation of solutions of acrylonitrile polymers in dimethyl formamide and similar solvents and, in particular, to the preparation of such solutions which possess an improved resistance to the formation of color upon heating.

Acrylonitrile polymers containing at least 85% of acrylonitrile in the polymer molecule are insoluble in ordinary organic solvents. It has been found, however, that dimethyl formamide serves as a useful solvent medium for these difficultly soluble polymers. The solution of the polymers in dimethyl formamide is normally effected by the use of heat. Furthermore in shaping articles, particularly filaments, yarns and films, from the solutions of these polymers in dimethyl formamide, heating is usually resorted to in order to obtain the proper solution characteristics, i. e. the proper viscosity and homogeneity. Where heat is resorted to either to form the solution of the polymer or in the manufacture of shaped articles from such solutions, a yellow or brownish yellow color is frequently developed in the solution and transmitted to the shaped article formed therefrom.

The exact mechanism which causes this color formation has not been determined with certainty. The initial appearance of color can be somewhat retarded by slurrying the polymer in an oxygen-free atmosphere, but even so an undesirable discoloration may occur when the slurry is heated to effect solutions. Metal ions in general, such as iron, copper and manganese, frequently lead to high discoloration of N,N-dimethyl formamide solutions of polyacrylonitrile. This discoloration tendency is even more apparent when the solution is subjected to heat in the presence of such metals. In addition, it is believed that the dimethyl formamide obtained from commercial sources contains certain organic amines, particularly dimethylamine, which appear to react with the polymer, particularly at elevated temperatures, to form products which impart undesirable color to the polymer solutions. The heating of dimethyl formamide during the formation of the solutions of said polymers and also the subsequent heating of the solutions just prior to converting it into articles, such as filaments, yarns and films, may cause the formation of additional compounds, such as amines, which like the amines present as impurities in dimethyl formamide, impart an undesirable degree of color to the polymer solutions and to the products produced from these solutions. These remarks relative to dimethyl formamide apply also to similar solvents, such as N-formyl morpholine, N,N-diformyl piperazine, etc. and to any solvent such as tetramethylene cyclic sulfone, gamma-butyrolactone, etc., although color formation is not serious with the non-amide type solvents.

It is an object of the present invention to minimize color formation in polymer compositions. A further object pertains to color diminutions in polymer compositions which develop color with the passage of time, particularly when solutions of the polymers are permitted to stand for a prolonged period of time, or at elevated temperatures. A further object of the invention is concerned with the diminution of color in solutions of acrylonitrile polymers and in articles produced from such solutions. An additional object relates to the production of solutions of acrylonitrile polymers and articles produced therefrom having improved color characteristics. Other objects will appear hereinafter.

The objects of this invention are accomplished by dissolving an acrylonitrile polymer in a solution of N,N-dimethyl formamide or similar solvent containing from 0.1–2% (by weight based on the polymer) of an organic acid anhydride and a similar amount of an organic sulfur compound that reacts as a thiol, that is, a sulfhydryl (—SH) containing substance or a substance in equilibrium with a sulfhydryl containing substance.

When used alone as heat stabilizers for acrylonitrile polymers containing at least 85% (by weight) acrylonitrile, the thiols are only slightly and insufficiently effective but when used in combination with an organic acid anhydride remarkable results are obtained. These results are truly remarkable because, while the anhydrides, such as acetic anhydride, when used alone have some effect, they are not nearly as effective as the combination. Likewise, the corresponding organic acids cannot be substituted for the anhydrides in combination with a thiol to obtain satisfactory results.

This invention can best be illustrated by reference to the following examples in which all parts and percentages are by weight unless otherwise noted.

EXAMPLE I

Two and one-half parts of polyacrylonitrile having an average molecular weight of about 60,000 was weighed out in a tortion balance and quantitatively transferred to a bottle. To 47.2 parts of dimethylformamide were added 0.05 part of the various adjuvants, and then the dimethylformamide containing adjuvants was added to the polymer in the bottle. The mixture then contained 5.0% by weight of polymer and 2.0% of each adjuvant based on polymer. The mixtures were then shaken by hand for one minute to form a slurry and next heated for one hour in a constant temperature oil bath maintained at 125° C. After this heating period, the bottles were removed from the bath and set aside to cool for one hour at room temperature. Color indices (125° C.) were determined using the Fisher Electro-photometer by reading the "A" scale of the instrument with each of the 425, 525, and 650 millimicron filters, respectively. Dimethylformamide was used as the reference. The three readings were averaged, and this average recorded as the color index. Solutions whose color indices were found to be lower than the control (no stabilizer) were solutions of improved color. The results of a series of experiments are shown in Table I.

*Table I*

| Experiment | Color Index |
|---|---|
| 1. Control—no stabilizer | 24.1 |
| 2. Thiosorbitol | 14.4 |
| 3. Acetic anhydride | 9.9 |
| 4. Acetic anhydride+thiosorbitol | 4.9 |
| 5. Benzoic anhydride | 17.6 |
| 6. Benzoic anhydride+thiosorbitol | 8.3 |
| 7. Succinic anhydride | 7.9 |
| 8. Succinic anhydride+thiosorbitol | 4.1 |
| 9. Phthalic anhydride | 22.1 |
| 10. Phthalic anhydride+thiosorbitol | 8.4 |
| 11. 2-Mercaptoimidazoline (2-MI) | 16.0 |
| 12. Acetic Anhydride+2-MI | 9.7 |
| 13. Succinic anhydride+2-MI | 10.4 |
| 14. 1-Thioglycerol (50% aqueous soln.) | 23.7 |
| 15. Acetic anhydride+1-thioglycerol (50% aq. soln.) | 8.4 |
| 16. Succinic anhydride+1-thioglycerol (50% aq. soln.) | 5.4 |
| 17. 1,2 Dithioglycerol | 12.0 |
| 18. Succinic anhydride+1,2-dithioglycerol | 4.4 |

EXAMPLE II

The effectiveness of the new stabilizer combinations on dimethylformamide solutions of acrylonitrile copolymers is further illustrated in Table II. The experiments were carried out exactly as described above with the exception that the polymer used was a copolymer of acrylonitrile made from a comonomer composition containing 95% by weight of acrylonitrile and 5% by weight 2-vinylpyridine.

*Table II*

| Experiment | Color Index |
|---|---|
| 1. Control-no stabilizer | 17.7 |
| 2. Thiosorbitol | 11.0 |
| 3. Thiosorbitol+acetic anhydride | 8.4 |
| 4. Thiosorbitol+succinic anhydride | 5.7 |

EXAMPLE III

As described in Example I, the following combinations gave the results indicated. The tests were conducted using polyacrylonitrile and an acrylonitrile/2-vinylpyridine (95/5) copolymer.

*Table III*

| Stabilizers | Color Index | |
|---|---|---|
| | Polyacrylonitrile | Acrylonitrile/Vinylpyridine Copolymer |
| 1. Control | 20 | 18 |
| 2. Succinic anhydride+Thiovanol* (TV) | 6 | 10 |
| 3. Benzoic anhydride+TV | 10 | 11 |
| 4. Butanetetracarboxylic dianhydride+TV | 8 | 9 |
| 5. Dimethylmaleic anhydride+TV | 15 | 12 |
| 6. Pyromellitic dianhydride+TV | 10 | 10 |
| 7. Tetrahydrophthalic anhydride+TV | 7 | 8 |
| 8. Succinic anhydride+formthional | 8 | 11 |
| 9. Thiobenzoic anhydride+thiosorbitol (TS) | 8 | |
| 10. Tri-isobutenylsuccinic anhydride+TS | 5 | |

*Thiovanol is a 50% aqueous solution of 1-thioglycerol.

Yarns prepared from acrylonitrile polymers containing at least 85% acrylonitrile possess highly desirable properties and are, therefore, highly useful, particularly for industrial purposes. These yarns are prepared at the present time by the dry spinning of solutions of the polymer. Since the solvents used possess fairly high boiling points, usually high temperatures, usually 200°–300° C., are required in the spinning cell to evaporate the solvent. These high temperatures lead to the formation of color in the yarns prepared by this process unless the polymer solutions are appropriately stabilized. Since practically all of the color formation occurs during the dissolution and spinning operations, it is inconsequential that the stabilizer may be removed in the subsequent pressure-washing step.

The stabilizers of this invention may be added to the solvent, such as dimethyl formamide, and dissolved therein either before or after slurrying this solvent with the acrylonitrile polymer. Since the slurry must be heated to effect solution, it is essential that the stabilizer be added prior to the actual dissolving of the polymer. Although it is advantageous for the best results to convert the slurry to solution immediately prior to spinning, this is not necessary. When using the stabilizers of this invention, one can prepare the polymer solution, deaerate it in a rest tank, and feed it to the spinning operation at any desirable time without the formation of excessive color.

Any organic anhydride may be used in the stabilizers of this invention. The carboxylic acid anhydrides are especially useful because of their availability. The anhydrides may be prepared from the same acid or mixed anhydrides may be used. Such compounds as succinic anhydride and acetic anhydride are preferred. Combinations of thioglycerol or 1-thiosorbitol with succinic anhydride or acetic anhydride are preferred.

As shown in the examples, while the anhydrides do stabilize the polymer solutions or prevent the formation of color in acrylonitrile polymer yarns spun from dimethyl formamide solutions to some extent when used alone, they must be used in conjunction with an organic sulfur compound which reacts as a thiol for the great stabilization afforded by this invention. By such a compound is meant a substance which contains the sulfhydryl group, —SH. The expression "react as a thiol" signifies compounds containing the sulfhydryl group or which are in equilibrium with a structure containing this group. For example, on page 534 of Whitmore's "Organic Chemistry," thiourea is shown to exist in two structures which are in equilibrium with one another. That one structure contains the —SH group is indicated by the fact that thiourea oxidizes to yield a disulfide or a sulfinic acid as is customary with —SH compounds. In addition, alkyl halides react readily to give S-alkyl compounds as proved by their hydrolysis to mercaptans. Dithiobiuret undergoes similar reactions.

This class of sulfhydryl containing compounds includes the mercaptans, polymercaptans, substituted thiols such as hydroxy substituted and the amino substituted thiols, as thiourea, dithiobiuret and their substituted derivatives. While hydrogen sulfide, methyl or ethyl mercaptan and the like will work, they are not preferred because of their low boiling points. They are useful, however, as in the preparation of solutions and in the formation of shaped articles at temperatures below their boiling points. There are many such instances as, for example, in film casting, etc. In order that the thiols not be removed too rapidly by evaporation during the spinning operation, it is preferred that the thiols used in the spinning have a boiling point in excess of 100° C. In high temperature operations, it is preferred to use sulfhydryl compounds that have boiling points of 100° C. or over. Of the various sulfhydryl compounds, hydroxy thiols and, in particular, thioglycerol and thiosorbitol are preferred.

Other sulfur-containing organic compounds, such as the sulfides, polysulfides, and heterocyclic ring compounds in which the sulfur is part of the ring are inefficient, unless, of course, they also contain a sulfhydryl group. Compounds such as naphthalene disulfonic acid, sulfosalicyclic acid, 2,4-dimethyl-3-sulfolene and para-dithiane do not react as thiols and could not be substituted therefor.

The amount of the stabilizer components used may vary from 0.1% to 2% by weight based on the weight of the polymer used. Although it is not essential, it is preferred to use equal amounts of the stabilizer components. Amounts greater than 2% of each component do not further improve the color of the spinning solution.

When the polymer and solvent mixing and slurrying are done under a blanket of nitrogen, the solution color obtained is slightly better. However, the trouble and expense involved in such a process do not make it worthwhile, and in many instances, a small increase in the amount of stabilizer will accomplish the same results.

Although the examples and discussion thus far have been directed to the use of dimethyl formamide as the solvent for the polymer, other solvents may be used, but the stabilizers are particularly helpful with solvents which either contain organic amine bases or develop them on standing or on heating. These are the amide solvents, such as the N-acyl substituted secondary amines which usually involve undesirable color formation. N-formyl morpholine, like dimethyl formamide, generates amines on severe heating and such compounds are included within the spirit of the invention. Other such solvents for acrylonitrile polymers which develop amines or which may contain them as impurities are the following: N-formyl hexamethyleneimine, N-formyl pyrrolidine and the like. The amine which causes the development of the undesirable color may be substantially colorless in itself as in the case of dimethyl amine, for example. It is extremely difficult in many cases to remove the small quantities of organic amines present in the solvent and it is furthermore especially difficult to prevent the formation of small amounts of organic amines upon heating to elevated temperatures of the order of 125° C. and upward, such temperatures being frequently necessary to obtain a proper solution of the polymer or to impart to the solution the proper viscosity and other properties necessary for the formation of commercial articles. It is thought that the decomposition of these formamide derivatives to organic amine bases is especially prevalent in the presence of even traces of heavy metals, such as iron. The present invention makes possible the commercial use of such materials and solutions without the undesirable color formation, which would normally accompany their use.

It has been shown in the above examples that color formation in solutions of acrylonitrile polymers can be greatly diminished by the addition of the stabilizer combinations of this invention. The improvement in the solution occurs to the same extent in shaped articles formed from the solution, since the articles acquire at least in part the color characteristics of the solutions from which they are formed when the impurities, as in the present case, are not removed during the formation of shaped articles. Thus, the present invention also makes possible the production of filaments, yarns, films, tubing, coatings and other forms of articles having greatly improved color. Such acrylonitrile polymer articles containing the stabilizers of this invention, either present in added or calculated amounts or as residues from a previous step, as spinning, are more stable to discoloration at high temperatures than corresponding articles containing no stabilizer. The improvements in color are not limited only to the formation of yarns by dry spinning techniques. Since a considerable amount of heating is required to effect solution of acrylonitrile polymers containing at least 85% acrylonitrile in dimethyl formamide, this invention is also useful in preparing articles having improved color by processes such as the casting of films, wet spinning of yarns and the like.

While the invention is of great utility when applied to polyacrylonitrile, it is especially applicable to other acrylonitrile polymers in which at least 85% by weight of the polymer is acrylonitrile. Most important of these copolymers is the readily dyeable copolymer comprising from 90% to 98% acrylonitrile by weight and from 2% to 10% by weight of a vinylpyridine, such as 2-vinylpyridine. In addition to being readily dyeable with acid dyestuffs, yarns prepared from this copolymer retain the many desirable properties of polyacrylonitrile yarns.

Although the acrylonitrile polymers containing at least 85% by weight of acrylonitrile are preferred in the practice of this invention, the invention may be applied to polymers containing lower percentages of acrylonitrile in the polymer molecule. Color formation likewise occurs in the preparation of solutions of other types of polymers due to the presence of organic bases which may, in some cases, be formed by the use of high temperatures and the invention contemplates the diminution or color in such polymers by the use of the stabilizer combination described herein.

By means of the process of this invention, it is possible to prepare solutions of acrylonitrile polymers in dimethyl formamide, which solutions are nearly colorless. The improvement in solution color leads to greatly improved yarn color. The yarn in turn can be dyed to brighter shades and is much more suitable for use in the apparel field.

These yarns, and fabrics prepared therefrom, are more stable to discoloration at high temperatures than those prepared from unstabilized solutions of acrylonitrile polymer. In addition, it has been found that the yarns from the stabilized solutions of this invention retain their tenacity for much longer periods of time at high temperatures. For example, yarn from an unstabilized solution of polyacrylonitrile in dimethylformamide was heated for twelve days at 165° C., after which its tenacity was found to be 0.6 gram/denier. On the other hand, yarn prepared from certain compositions of Example 1, retained a tenacity of 1.9 grams/denier after heating for twelve days at 165° C.

In my copending application Serial No. 144,590, there is described another process using sulfoxy acid compounds with organic compounds that react as thiols. The results obtainable thereby are satisfactory but the results obtainable by the present combination of anhydrides/sulfhydryls are superior in certain respects. For example, on testing yarn produced by both processes, it has been found that the number of drawing breaks per pound is materially reduced by using the stabilizers of the present invention. Further, when delustering pigments are used, such as titantium dioxide, less agglomeration of the pigment occurs using the anhydride/sulfhydryl stabilizers than occurs using stabilizers described in my said application. These additional advantages in addition to the remarkable color stabilization make the stabilizers of this invention highly useful.

Any departure from the procedure described herein which conforms to the principles of the invention is intended to be included within the scope of the claims below.

I claim:

1. As a new composition of matter, a mixture comprising thiosorbitol and succinic anhydride.

2. As a new composition of matter capable of being used as a solvent, a mixture comprising N,N-dimethylformamide and a small amount of a color stabilizer comprising a mixture of an anhydride of an organic acid and an organic sulfur containing compound that acts as a thiol, said anhydride and said thiol being present in substantially equal amounts.

3. As a new composition of matter capable of being used as a solvent, a mixture comprising an amide being an N-acyl substituted secondary amine and a small amount of a color stabilizer comprising a mixture of an anhydride of an organic acid and an organic sulfur containing compound that acts as a thiol, said anhydride and said thiol being present in substantially equal amounts.

4. As a new composition of matter, a mixture comprising N,N-dimethylformamide; a small amount of a color stabilizer comprising a mixture of an anhydride of an organic acid and an organic sulfur containing compound that acts as a thiol, said anhydride and said thiol being present in substantially equal amounts; and a polymer of acrylonitrile.

5. As a new composition of matter, a mixture comprising an amide being an N-acyl substituted secondary amine; a small amount of a color stabilizer comprising a mixture of an anhydride of an organic acid and an organic sulfur containing compound that acts as a thiol, said anhydride and said thiol being present in substantially equal amounts; and a polymer of acrylonitrile.

6. As a new composition of matter capable of being used as a solvent, N,N-dimethylformamide and a small amount of a color stabilizer comprising substantially equal amounts of succinic anhydride and thioglycerol.

7. As a new composition of matter, a mixture comprising N,N-dimethylformamide; an acrylonitrile polymer; and about 0.1% to about 2% by weight, based on the weight of the said polymer, of a mixture comprising thioglycerol and succinic anhydride.

8. As a new composition of matter, a solution comprising N,N-dimethylformamide; an acrylonitrile polymer; and a mixture comprising about 0.1% to about 2% by weight, based on the weight of the said polymer, of thioglycerol and about 0.1% to about 2% by weight, based on the weight of said polymer, of succinic anhydride.

9. A composition in accordance with claim 8 wherein said polymer is polyacrylonitrile.

10. A process for preventing color formation in a shaped article prepared from a solution of an acrylonitrile polymer which comprises incorporating in said solution from about 0.1% to about 2% by weight, based on the weight of said polymer, of an anhydride of an organic acid and from 0.1% to 2% by weight, based on the weight of said polymer in solution, of an organic sulfur containing compound that acts as a thiol.

11. A process in accordance with claim 10 in which said solvent is N,N-dimethylformamide.

12. As a new composition of matter, a mixture comprising a polymer of acrylonitrile and, based on the weight of said polymer, about 0.1% to about 2% of thiosorbitol and about 0.1% to about 2% of succinic anhydride.

13. As a new composition of matter, a mixture comprising a polymer of acrylonitrile and, based on the weight of said polymer, from about 0.1% to about 2% of an organic sulfur containing substance that acts as a thiol and, based on the weight of said polymer, about 0.1% to about 2.0% of an anhydride of an organic acid.

References Cited in the file of this patent

UNITED STATES PATENTS

| Number | Name | Date |
| --- | --- | --- |
| 1,936,562 | Kilbourne | Nov. 21, 1933 |
| 2,502,030 | Scheiderbauer | Mar. 28, 1950 |